United States Patent
Son et al.

(10) Patent No.: US 8,296,103 B2
(45) Date of Patent: Oct. 23, 2012

(54) NOISE AND VIBRATION DIAGNOSIS DEVICE FOR VEHICLE AND CONTROL METHOD THEREOF

(75) Inventors: Gyo Eun Son, Hwaseong (KR); Kyung Ho Kim, Uiwang (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 653 days.

(21) Appl. No.: 12/499,665

(22) Filed: Jul. 8, 2009

(65) Prior Publication Data

US 2010/0082274 A1    Apr. 1, 2010

(30) Foreign Application Priority Data

Sep. 26, 2008  (KR) .................. 10-2008-0094943

(51) Int. Cl.
*G06F 11/30*  (2006.01)
(52) U.S. Cl. ........................................ 702/183
(58) Field of Classification Search ............. 702/56, 702/183
See application file for complete search history.

(56) References Cited

U.S. PATENT DOCUMENTS

| | | | |
|---|---|---|---|
| 6,693,367 B1 * | 2/2004 | Schmeisser et al. | 307/9.1 |
| 2004/0243351 A1 * | 12/2004 | Calkins et al. | 702/185 |
| 2005/0041459 A1 * | 2/2005 | McDonald | 365/154 |
| 2007/0118333 A1 * | 5/2007 | Miyasaka et al. | 702/183 |
| 2007/0164997 A1 * | 7/2007 | Gruber | 345/163 |
| 2007/0185664 A1 * | 8/2007 | Tanaka et al. | 702/56 |
| 2007/0283695 A1 * | 12/2007 | Figura | 60/601 |
| 2008/0068335 A1 * | 3/2008 | Arakawa et al. | 345/156 |

FOREIGN PATENT DOCUMENTS

| | | |
|---|---|---|
| KR | 2001-0009050 A | 2/2001 |
| KR | 10-2006-0099793 A | 9/2006 |
| KR | 10-2007-0048362 A | 5/2007 |
| KR | 10-2008-0082731 A | 9/2008 |

* cited by examiner

*Primary Examiner* — Mohamed Charioui
(74) *Attorney, Agent, or Firm* — Morgan, Lewis & Bockius LLP

(57) ABSTRACT

A noise and vibration diagnosis device and control method thereof may include a measuring sensor configured to be attached at a predetermined position of a vehicle to measure noise and vibration thereof, a signal input portion to which the noise and vibration signal that is generated from the measuring sensor is inputted, and a control portion configured to receive the signal that is transferred from the signal input portion and compare it with a predetermined reference value to output a replacement signal by which it is determined whether the component on which the measuring device is attached is to be replaced or not in accordance with the comparison result.

4 Claims, 21 Drawing Sheets

FIG.6

| | | | | |
|---|---|---|---|---|
| Vehicle information | Measurement position | Measurement procedure | | |
| Vehicle kind | Sonata (NF) | | | Change |
| Engine | 2.4 | | | Change |
| Vehicle number | 1234 | | | Input |
| File name | NF_SEAT_070125_1620 | | | |

◎ Vibration measurement

NOISE AND VIBRATION DIAGNOSIS DEVICE FOR VEHICLE AND CONTROL METHOD THEREOF

CROSS-REFERENCE TO RELATED APPLICATION

The present application claims priority of Korean Patent Application Number 10-2008-0094943 filed Sep. 26, 2008, the entire contents of which application is incorporated herein for all purposes by this reference.

BACKGROUND OF THE INVENTION

1. Field of the Invention

The present invention relates to a diagnosis device for a vehicle, and more particularly to a noise and vibration diagnosis device that measures noise and vibration generated in a vehicle, and a control method thereof.

2. Description of Related Art

Generally, noise and vibration that is generated in a vehicle reduces ride comfort of a passenger, and therefore a variety of researches have been undertaken to minimize the noise and vibration.

Many kinds of measuring apparatuses and methods have been developed so as determine the cause of noise and vibration that is generated during operation of a vehicle.

When a customer is dissatisfied regarding noise and vibration of a vehicle, the vehicle is taken to an A/S center, and a mechanic depends on his own personal experiences such as touching or listening to diagnosis the cause of the noise and vibration.

Therefore, there is no standard guide for detecting noise and vibration and therefore customer dissatisfaction can be caused by incorrect maintenance or replacement of an operable component, and there is also a problem that maintenance reliability can be deteriorated by not eliminating substantial causes of noise and vibration.

Also, data on the noise and vibration is not stored, mechanics cannot share the data with each other, and development of the information technology in the vehicle industry has been delayed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide for a noise and vibration diagnosis device for a vehicle that can be portably used, having advantages of measuring noise and vibration that is generated in a variety of positions of a vehicle through a plurality of channels to compare a measured value with a reference value that is predetermined according to the vehicle and to diagnosis a malfunction thereof.

Further, if the diagnosis result is in an abnormal condition, a specific component is guided to be replaced so that the vehicle maintenance process can be objectively performed.

A noise and vibration diagnosis device for a vehicle may include a measuring sensor configured to be attached at a predetermined position of a vehicle to measure noise and vibration thereof, a signal input portion to which the noise and vibration signal that is generated from the measuring sensor is inputted, and a control portion configured to receive the signal that is transferred from the signal input portion and compare it with a predetermined reference value to output a replacement signal by which it is determined whether the component on which the measuring device is attached is to be replaced or not in accordance with the comparison result.

The noise and vibration diagnosis device for a vehicle may further include a display portion that is disposed at a middle portion of a main body, a key input portion that is disposed at one side of the main body, an LED that is disposed at a predetermined position to display a power on/off state or a battery charge state, a power connector that is disposed at a predetermined position of one surface to receive external power, an SD card slot that is disposed at a predetermined position and in which a portable memory unit is mounted, a USB connector to which a USB cable is connected, and a K-line communication port that is disposed at a predetermined position of an upper side to be connected to an electronic control unit (ECU) of a vehicle.

The noise and vibration diagnosis device may further include an LED that is disposed in a predetermined position of the front side of the main body to indicate whether the measuring sensor that is connected to the measurement communication port is activated or not.

A user interface that is disposed in the main body may include a touch panel and a key input portion.

The key input portion may include a function key that consists of a power key for selecting one of power on or power off, a direction key for selecting one of an upper, a lower, a left, and a right direction, an enter key, an ESC key, and a home key.

The noise and vibration diagnosis device may further include a first interface portion that communicates with an electronic device through a USB connector, a second interface portion that communicates with an ECU that is connected to the K-line communication port, a power portion that supplies respective load elements with the voltage of 12V DC that is supplied from a battery of a vehicle, a rechargeable battery that is charged by the power that is supplied from the power portion and supplies the charged power to the load elements in a condition in which the external power is not supplied, a signal transformation portion that transforms a CAN signal that is transmitted from the ECU of a vehicle to the signal that can be recognized in a control portion, an ADC that transforms an analog signal that is transmitted from a signal input portion to a digital signal that can be recognized in the control portion, a micom that resets the system or turns power on/off according to the input of the power key, a clock generating portion that generates a clock frequency at a predetermined cycle to operate the control portion in a power-on state, a memory portion in which an operating algorithm for the control portion, reference values that are standardized according to the measurement position of a vehicle, and measured values of noise and vibration are stored, a glory lighting portion for lighting the display portion according to control of the control portion, a touch recognition portion that recognizes a user selection signal of the touch panel, an audio processing portion that emits voice signals, and a display portion for displaying operation data regarding the noise and vibration measurement and diagnosis.

The first interface portion updates a related program, backs up the measured data, renews the reference values according to the measurement positions that are set according to a kind of vehicle, and sends out or receives the update information.

The signal input portion includes a noise sensor or a vibration sensor, and an acceleration sensor can be applied to the vibration sensor.

The audio processing portion audibly outputs procedures for measuring the noise and vibration and the measurement results thereof.

The memory portion includes a flash ROM configured to store an algorithm for the operation of the control portion, an SDRA configured to store the reference values according to the measurement positions that are predetermined corresponding to the kind of vehicle, the measurement result, and the diagnosis result, and an SD/MMC that is a portable memory unit.

The audio processing portion includes an audio codec configured to modulate a voice signal and an amp configured to amplify the modulated voice signal to a predetermined level so as to broadcast as an audible sound through a speaker.

A control method of a noise and vibration diagnosis device for a vehicle may include setting a condition, vehicle information, and a measurement position through a user interface, comparing a noise and vibration value that is measured for a predetermined period with a reference value according to measurement positions that are predetermined corresponding to the kind of vehicle, and performing a guidance function to replace a predetermined component, if the measured value is higher than a predetermined reference value as a comparison result.

The vehicle information is set in accordance with the kind of vehicle and engine exhaust amount, and the measurement position may include a seat rail, a steering wheel, an engine mount, and a front roll (front wheel bearing).

A control method of a noise and vibration diagnosis device for a vehicle may include setting a noise and vibration measurement condition through a user interface and measuring noise and vibration of a seat rail and a handle, determining whether the measured noise and vibration value is higher than a reference value (A) that is predetermined in a predetermined position according to a vehicle, determining that the vehicle is in abnormal state if the noise and vibration measurement value is in excess of the reference value (A) and determining whether the noise and vibration measurement value of the vibration induction side of an engine mount is in excess of a reference value (B), determining whether the noise and vibration measurement value of the rotational component configured to be connected to the engine is in excess of a reference value (C) if the measurement value of the vibration induction side of the engine mount is in excess of the reference value (B), and determining a defective component that is related to the noise and vibration and performing a guidance function to replace a predetermined component if the noise and vibration measurement value of the rotational component is in excess of the reference value (C).

If the noise and vibration measurement value of the rotational component does not exceed the reference value (C), it is determined that the tensile force of a belt is in an abnormal range to guide the belt to be replaced.

The rotational component includes an alternator, a power steering pump, and an air conditioner compressor.

If the measurement value of the vibration induction side of the engine mount does not exceed the reference value (B), the noise and vibration of the vehicle body side in the engine mount is measured, if the difference value (a) of the measurement value of the vibration induction side of the engine mount minus the measurement value of the engine mount vehicle body side exceeds a reference value (E), it is determined whether the rotational component is in a normal state or not, and if the difference value (a) does not exceed the reference value (E), it is determined that the engine mount is in an abnormal state to guide the replacement thereof.

The noise and vibration causing the dissatisfaction that is expressed by the customer can be diagnosed in a short time and an objective maintenance service is provided such that the mechanic can provide reliable service to the customer.

Also, the diagnosis is performed through a standard process to reduce the maintenance time and the cost thereof, and a database for the maintenance data can be established such that the maintenance data can be commonly used to provide uniform quality among maintenance centers through a network.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 6 shows an exemplary vehicle information setting screen in a noise and vibration diagnosis device for a vehicle according to the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
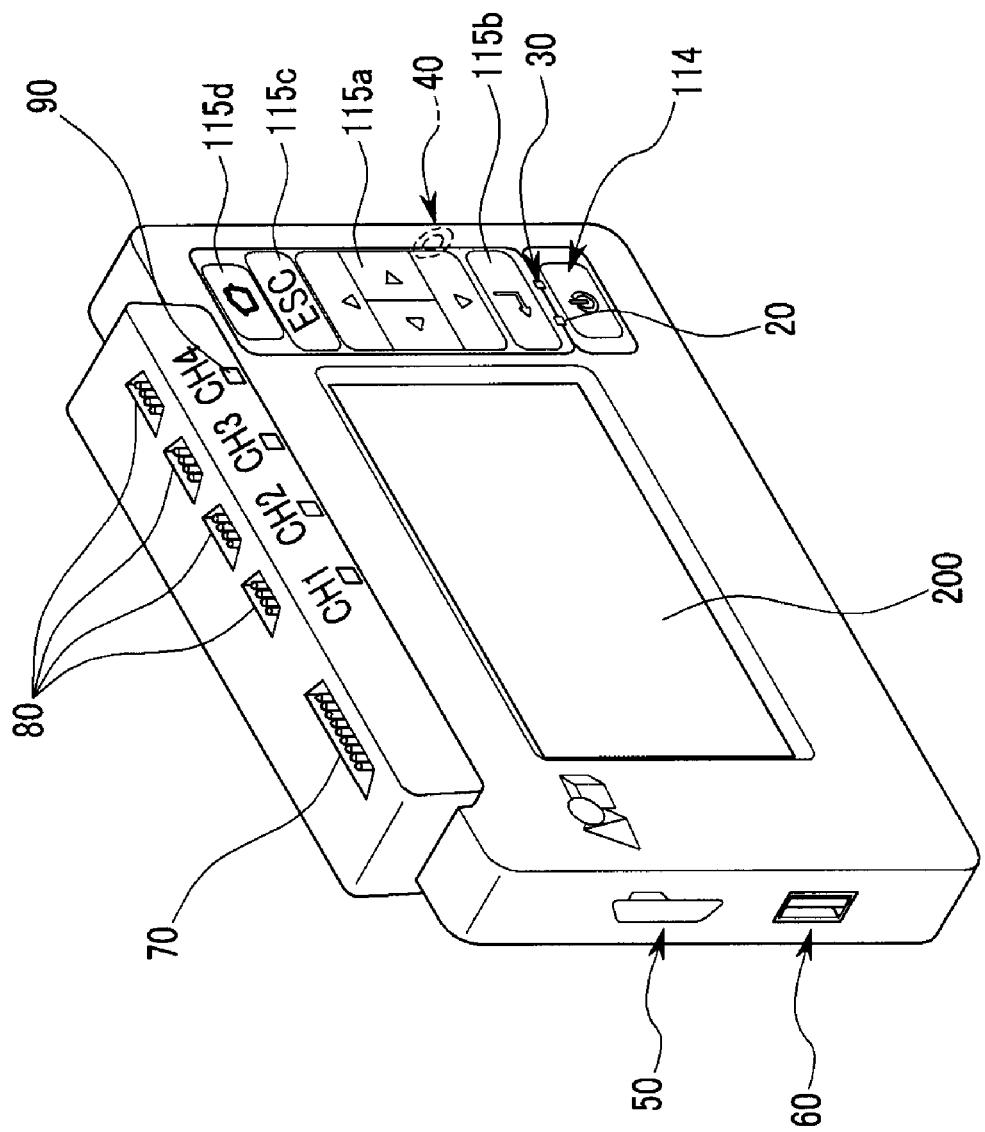
FIG. 1 is a perspective view of an exemplary noise and vibration diagnosis device for a vehicle according to the present invention.

FIG. 1 is a perspective view of a noise and vibration diagnosis device for a vehicle according to various embodiments of the present invention.

In the present invention, a display portion 200 is disposed in the middle of a main body, and the display portion 200 includes a color TFT LCD and a touch screen, and a variety of function keys 115 and a power key 114 are disposed around them.

One LED 20 for indicating whether the power is on or off and the other LED 30 for indicating the charge condition are disposed in a right upper portion of the power key 114.

The LED 30 showing the charge condition of the battery emits green or orange light according to the level of the battery voltage.

The function keys 115 includes a direction key 115a for selecting up/down and left/right directions, an enter key 115b, an ESC key 115c, and a home key 115d for returning to a main home page. Accordingly, a touch screen and key input user interfaces are simultaneously provided.

Further, a power connector 40 is disposed in one side surface to receive external power, that is, vehicle battery power, and an SD card slot 50 to which a portable memory card (SD card) is inserted and a USB connector 60 to which a USB cable is connected are disposed in the other side surface.

Also, a K-line communication port 70 that is connected to an electronic control unit (ECU) of the vehicle is disposed in an upper side to transmit/receive control information, and a measurement communication port 80 that is connected to a measuring sensor is disposed to measure the noise and vibration from a certain position of the vehicle.

The measurement communication port 80 is composed of several ports, for example four ports, and the number thereof can be changed according to design specifications.

The measuring sensor is connected to the measurement communication port 80 in a front upper side of the main body, and LEDs 90 for indicating whether the measuring sensor is enabled to detect the noise and vibration are respectively disposed corresponding to the respective measurement communication ports 80.

Figure 2:
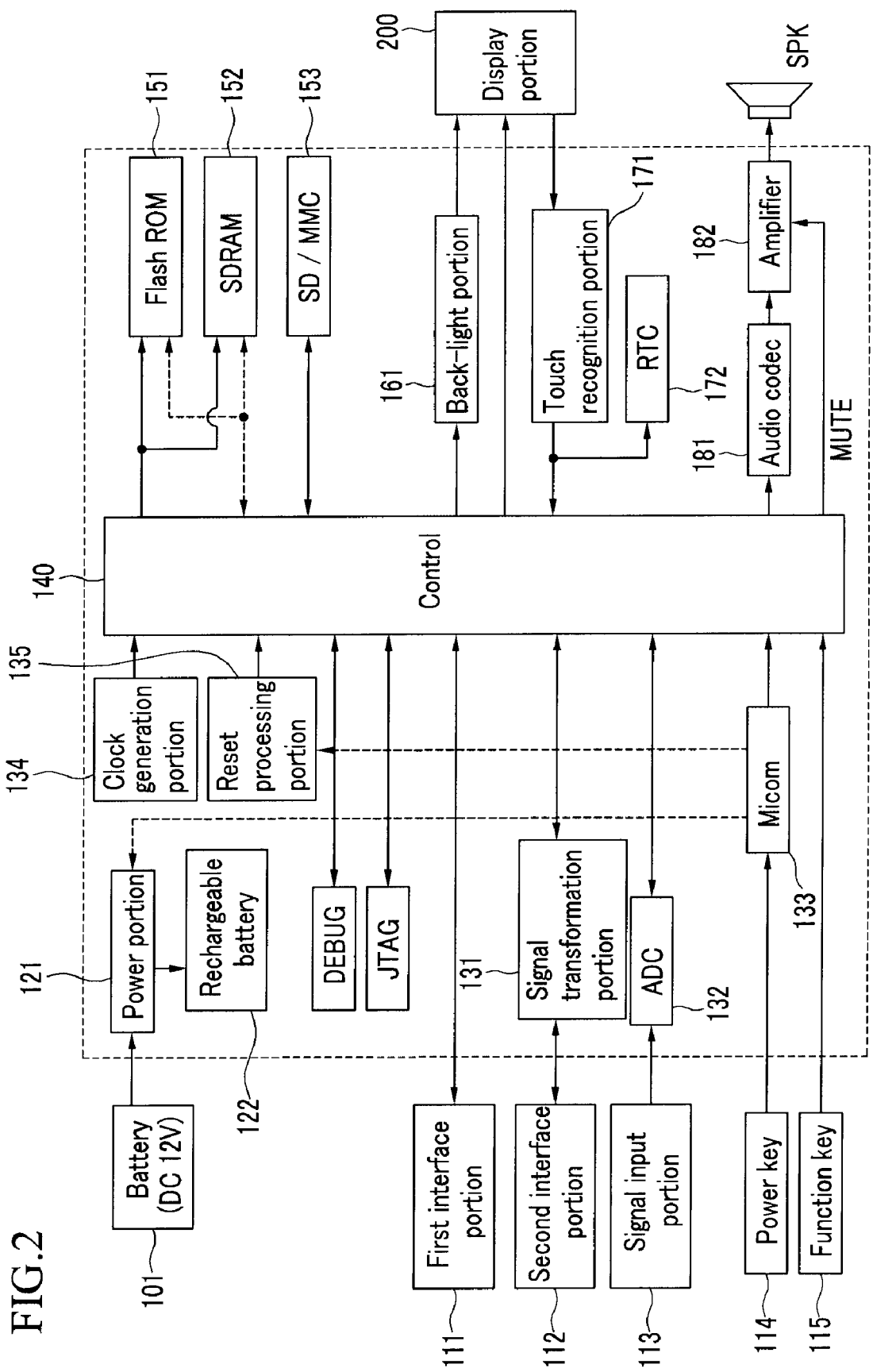
FIG. 2 is a block diagram of an exemplary noise and vibration diagnosis device for a vehicle according to the present invention.
Figure 3:
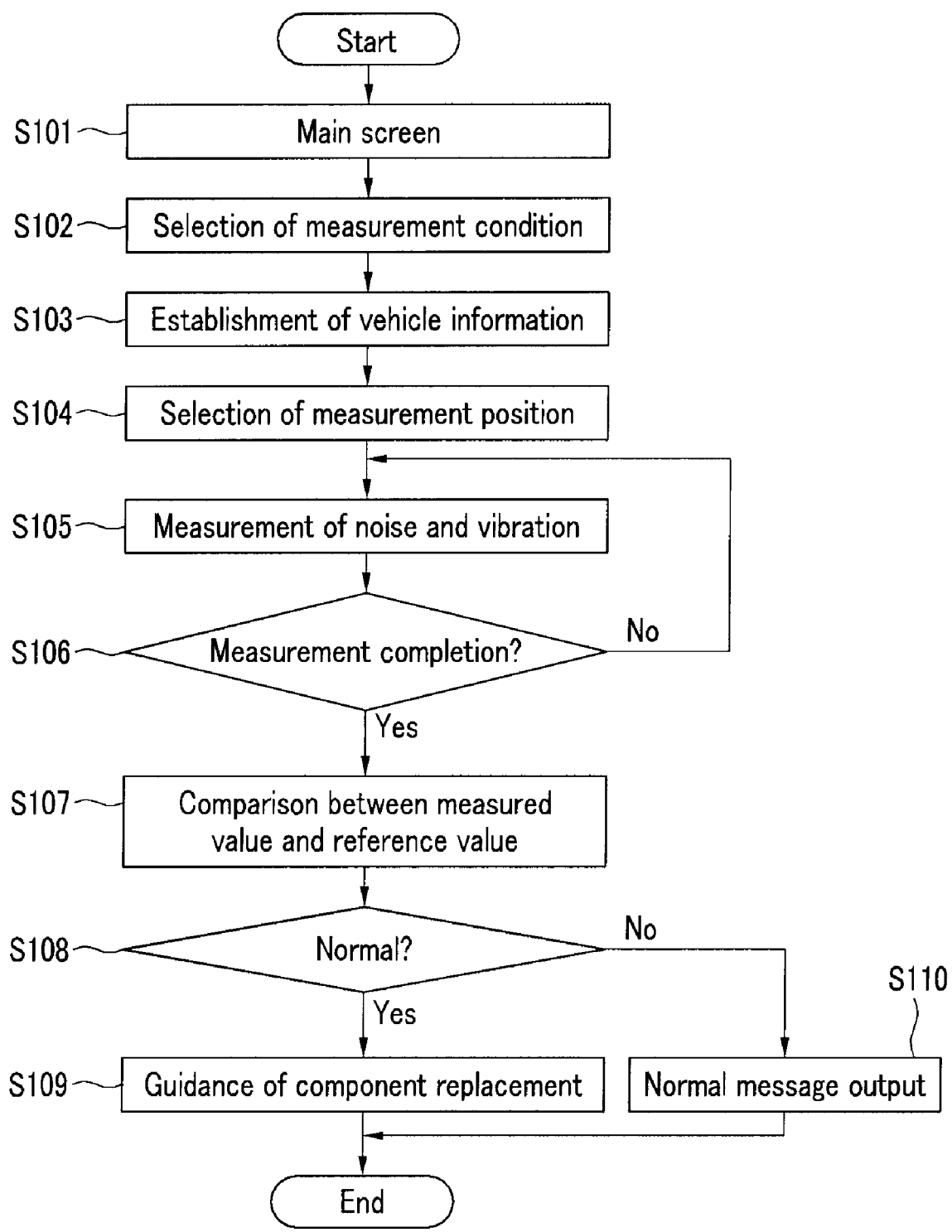
FIG. 3 is a flow chart for controlling an exemplary noise and vibration diagnosis device for a vehicle according to the present invention.

FIG. 2 is a block diagram of a noise and vibration diagnosis device for a vehicle according to various embodiments of the present invention.

As shown, the hardware of the present invention includes a battery 101, a first interface portion 111, a second interface portion 112, a signal input portion 113, a power key 114, a function key 115, a power portion 121, a recharge battery 122, a signal transformation portion 131, an ADC 132, a micom or microcomputer 133, a clock generation portion 134, a reset portion 135, a control portion 140, a flash ROM 151, an SDRAM 152, an SD/MMC 153, a back-light portion 161, a touch recognition portion 171, an RTC 172, an audio codec 181, an amplifier 182, and a display portion 200.

The battery 101 supplies the power connector 40 shown in FIG. 1 with electrical power that is needed to operate the noise and vibration diagnosis device.

The first interface portion 111 provides a data signal to the electronic device that is connected to the USB connector 60 shown in FIG. 1 through a USB cable.

For example, a program update for measuring the noise and vibration, a data back-up, a renewal of the reference value according to the measurement position that is predetermined corresponding to a kind of vehicle, and an update information are transmitted/received through the first interface portion 111.

The second interface portion 112 performs data communication with the electronic control unit of the vehicle through a communication cable.

For example, a vehicle specification, an engine RPM, diagnosis signals that are detected during the vehicle operation, and so on are transmitted/received through the second interface portion 112 during the measuring process of the noise and vibration.

The signal input portion 113 includes a measuring sensor (not shown) that is connected to the measurement communication port 80 shown in FIG. 1 to detect the noise and vibration that is generated in a certain position of the vehicle and to output signals related thereto.

A microphone as a noise detecting sensor or an acceleration sensor as a vibration detecting sensor can be applied to the measuring sensor of the signal input portion 113, and a variety of sensors can be applied according to design specifications.

The power is turned on or off through the power key 114 that is operated by the mechanic or the user.

The function key 115 that is selected by the mechanic selectively performs a variety of functions so as to measure and analyze the noise and vibration.

The power portion 121 transforms 12V DC that is supplied from the vehicle battery 101 to a necessary level to supply each element therewith.

The recharge battery 122 is built in the noise and vibration diagnosis device according to the present invention and is recharged by the electricity that is supplied from the power portion 121, and supplies the charged current to each load elements in case the outside power is not supplied.

The signal transformation portion 131 transforms a CAN signal that is transmitted from the electronic control unit of the vehicle into signals that the control portion 140 can recognize.

Further, the signal transformation portion 131 transforms the signals that are made by the control portion 140 to CAN signal so as to transmit them to the electronic control unit of the vehicle.

The ADC 132 transforms the analogue noise and vibration signal that is transmitted from the signal input portion 113 as a measuring sensor to the digital signals that the control portion 140 can recognize to output them.

The micom 133 controls the on/off state of the power, that is, the power portion 131, according to the power on/off state of the power key 114.

Further, the micom 133 controls the reset portion 135 so as to reset the device according to the operation of the power key 114.

The clock generation portion 134 creates a clock frequency at a predetermined cycle during the power on state so as to enable the control portion 140 to be operated.

The reset portion 135 resets the program that is executed according to the control signal that is transmitted to the micom 133.

The control portion 140 is executed by the clock frequency of the clock generation portion 134 during the power on state by the power portion 121.

Further, the control portion 140 controls the data communication through the first interface portion 111 and the second interface portion 112, and stores the transmitted/received data in the flash ROM 151, the SDRAM 152, or the SD/MMC 153.

The control portion 140 determines vehicle data, a measurement condition, and a measurement position according to the input data of the function key 115 in a measurement mode, and then receives the signals of the signal input portion 113 to measure the noise and vibration for a predetermined period.

Further, the control portion 140 compares the measurement value with the reference value according to the measurement positions that are predetermined corresponding to the kind of vehicle, and if the diagnosis result is in an abnormal range, it is determined that the component to which the measuring device is attached is to be replaced and the display portion 200 performs a guidance function to replace the component.

Also, the control portion 140 audibly outputs overall procedures and measurement results to effectively evaluate the noise and vibration in the measurement mode.

The operating algorithm that is necessary to operate the control portion 140 is stored in the flash ROM 151, and the reference value, the measurement position data, and the measurement results according to the vehicle are stored in the SDRAM 152.

The SD/MMC 153 is a portable memory disk that is inserted into an SD slot and stores data for upgrading the operating algorithm that is stored in the flash ROM 151, the measurement positions that are predetermined according to the vehicle, the reference values corresponding to the measurement positions, and the diagnosis results for the noise and vibration.

The back-light portion 161 lights the display portion 200 according to the control signal of the control portion 140.

The touch recognition portion 171 as a user interface recognizes the user's touch signals that are transferred from the touch panel to provide them to the control portion 140.

Further, the vehicle data, the measurement conditions, and the measurement positions are established through the touch recognition portion 171, and the related screen is displayed through the display portion 200.

The RTC 172 stores real time data to provide them to the control portion 140.

The audio codec 181 modulates voice signals according to the signals outputted from the control portion 140, and the amplifier 182 amplifies the voice signals to a predetermined level to output them through a speaker.

The display portion 200 displays overall procedures, progress state, and diagnosis results in a predetermined format.

The operating method of the present invention including the functions as stated above is as follows.

In case the vehicle is put into an A/S center to diagnose a noise and vibration thereof, the vehicle battery 101 is connected, the system is booted by the power key 114 according to the control of the micom 133, and the power portion 121 supplies the power to the respective load elements (S101).

Next, the touch panel or the function keys 115 that are disposed in the display portion 200 are used to select one of noise measuring and vibration measuring in a measurement condition (S102) in the main screen of the noise and vibration diagnosis device according to the present invention.

The touch panel or the function key 115 is used to set the vehicle data that includes the kind of vehicle, the kind of engine (exhaust amount), and a vehicle number (S103).

Also, one of the measurement positions according to a respective channel, for example a seat rail, a steering wheel, a vibration induction side of the engine mount, a vehicle body side of an engine mount, a vibration induction side of a front wheel bearing, a vehicle body side of a front wheel bearing, a power steering pump, and an alternator is selected by the touch panel or the function key 115 (S104).

As stated above, if the condition is established to diagnosis the noise and vibration, the measuring sensor is attached to the selected measurement position to measure the noise and vibration for a predetermined period (S105).

At this time, the signal input portion 113 measures noise or vibration that is detected in the measurement position corresponding to the respective channel and provides it to the control portion 140 through the ADC 133.

Further, the control portion 140 stores the measured information in the SDRAM 152.

It is determined whether the measuring operation is performed for a predetermined period (S106), for example 5 seconds, and if the measuring is completed, the control portion 140 compares the measurement value with the reference values according to the measurement positions that are predetermined corresponding to a kind of vehicle (S107).

Also, the control portion 140 determines whether the results of the measured noise and vibration are normal or abnormal (S108).

If it is determined that the measured results of the noise and vibration are normal in S108, the control portion 140 displays the related message through the display portion 200 and simultaneously enables the speaker to audibly output that the vehicle is normal (S110).

However, if it is determined that the measured result is abnormal in S108, one of the fixed components or the rotational components that are predetermined to be related to the noise and vibration is selected, and the display portion 200 and the speaker guide the related component to be replaced (S109).

Accordingly, the mechanic replaces the component that causes the noise and vibration based on the reliable and objective data.

The touch recognition portion 171 recognizes the input signal, of the touch panel and the input signal is provided to the control portion 140 as selection data.

In addition, in case the first interface portion 111 as a USB communication port is connected to the electronic device, the control portion 140 transmits/receives signals for a program update, a measured data back-up, renewal of the reference value, and dada update according to the selection of the function key 115 or the touch panel for measuring the noise and vibration.

Further, the electronic control unit is connected to the second interface portion 112 through the K-line communication port, and the vehicle data, the engine RPM, and the self-diagnosis signal that is detected during the operation of the vehicle are received/transmitted therethrough to diagnose the noise and vibration during the measuring process of the noise and vibration.

Also, the measured noise and vibration data is stored in the portable SD/MMC 153 to be commonly possessed for the next diagnosis and maintenance.

Figure 4A:
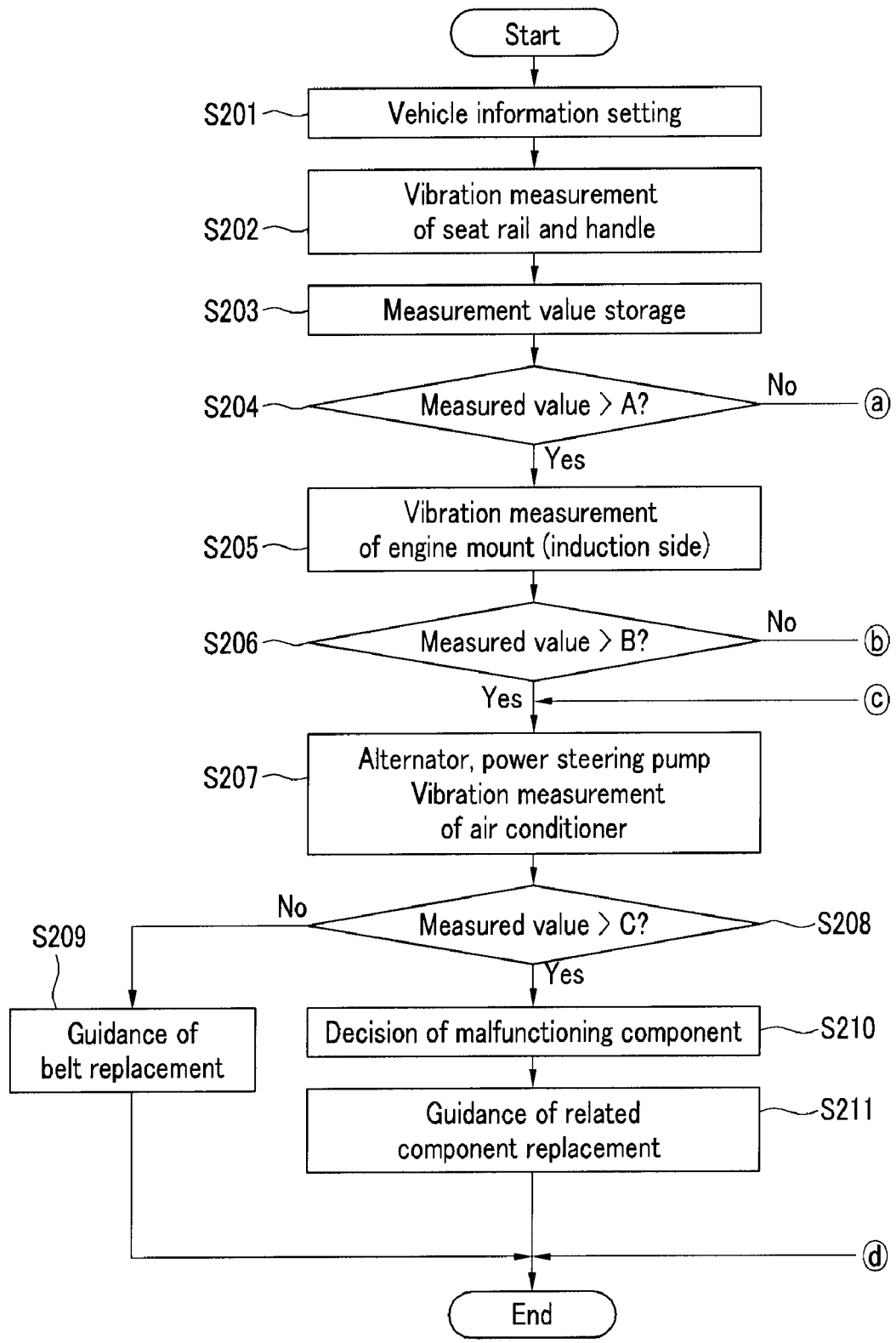
FIGS. 4A and 4B are flow charts showing a measuring procedure for an exemplary noise and vibration diagnosis device for a vehicle according to the present invention.
Figure 4B:
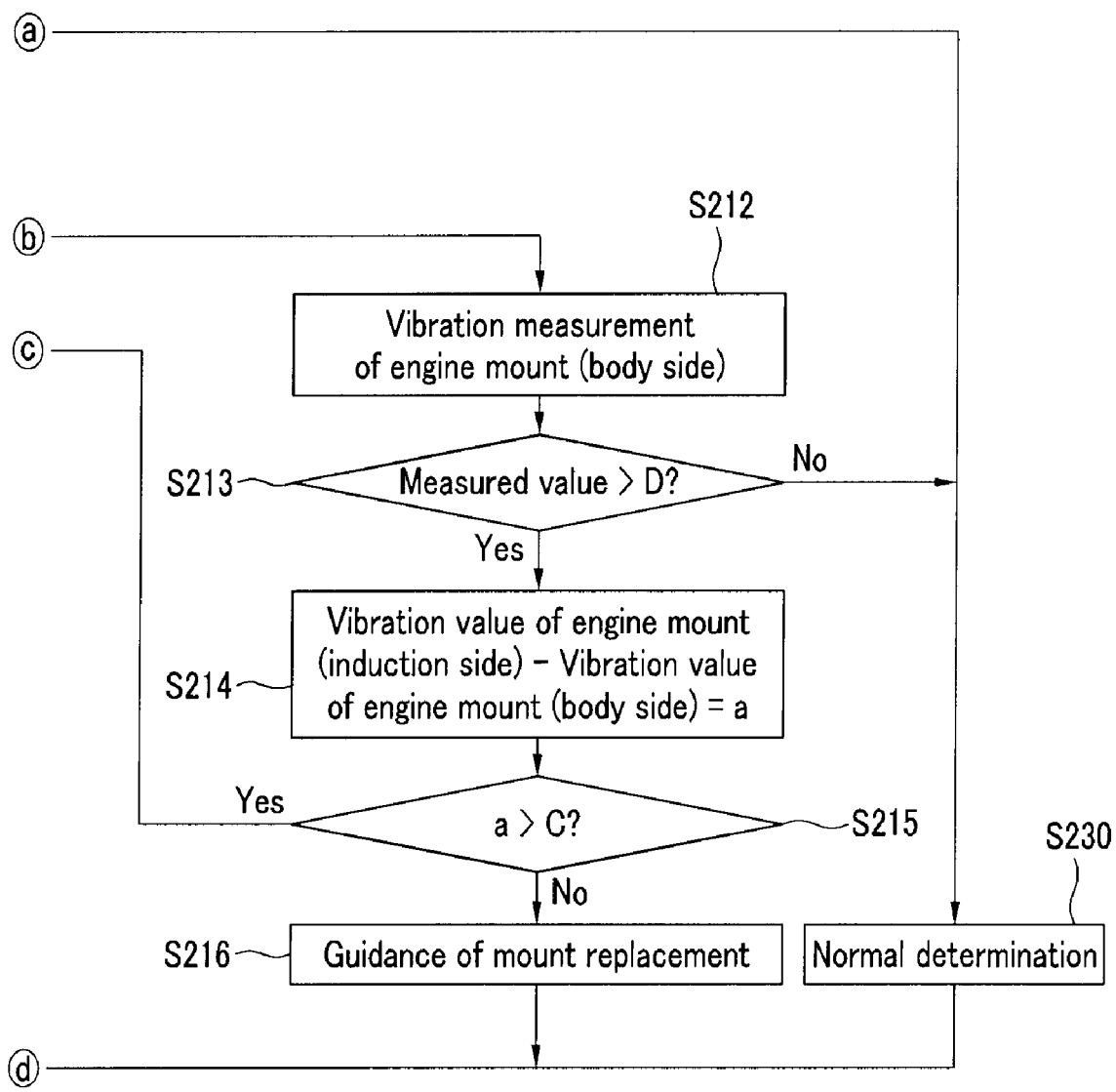

Referring to FIGS. 4A and 4B, the above operation will be explained as follows.

FIGS. 4A and 4B are flow charts showing a measuring procedure for a noise and vibration diagnosis device for a vehicle according to various embodiments of the present invention.

The vehicle data, that is, the kind of vehicle, the kind of engine (exhaust amount), the vehicle number, and so on are selected in the main screen (S201).

The measurement position is selected as a seat rail and a steering wheel and the measuring sensor is attached to each position, the noise and vibration that is generated in the related component is measured for a predetermined period of approximately 5 seconds, and the measured data is stored in the SDRAM 152 (S202, S203).

Then, the measured value of the seat rail and the steering wheel and the predetermined reference value (A) are compared with each other according to the kind of vehicle, and it is determined whether the measured value exceeds the reference value (A) (S204).

If the noise and vibration that is measured in the seat rail and the steering wheel exceeds the reference value (A), for example 86.7 dB, it is determined that it is in an abnormal state, and if the noise and vibration does not exceed the reference value (A), it is determined that the noise and vibration is in a normal range (S230).

However, if the measured value exceeds the predetermined reference value (A) in S204, it is determined that the related component is in an abnormal condition and then the measuring sensor is attached to the vibration induction side of the engine mount to measure the noise and vibration of the engine mount (S205).

Further, it is determined whether the measured value of the vibration induction side of the engine mount exceeds the reference value (B) that is predetermined (S206).

If the measured value in the S206 exceeds the reference value (B), the measuring sensors are attached to an alternator, a power steering pump, and an air conditioner compressor to measure the noise and vibration thereof (S207).

It is determined whether the measured value in S207 exceeds a reference value (C) that is predetermined (S208).

Then, if the measured value does not exceed the reference value (C), it is determined that the tensile force of the belt is in an abnormal state, and the belt is guided to be replaced through the display portion 200 and the speaker and the measured value and the diagnosis result are stored (S209).

However, if the measured value in S208 exceeds the reference value (C), a defective component that is predetermined to be closely related is selected (S210).

The defective component is guided to be replaced through the display portion 200 and the speaker (S211).

If the measured value of the vibration induction side of the engine mount does not exceed the predetermined reference value (B) in S206, the measuring sensor is attached to the vehicle body side of the engine mount.

Also, the noise and vibration are measured for a predetermined period (S212) and it is determined whether the measured value exceeds the reference value (D) that is predetermined in its related position (S213).

If the measured value does not exceed the predetermined reference value (D) in S213, it is determined that the noise and vibration that are generated in the engine mount is in a normal range (S230).

If the measured value exceeds the predetermined reference value (D), it is determined whether the difference value (a) between the measured value of the vibration induction side of the engine mount and the measured value of the vehicle body side of the engine mount exceeds a predetermined value (E) (S215).

If the difference value (a) does not exceed the reference value (E) in S215, it is returned to S207 to repeat the above procedures, and if the difference value (a) exceeds the reference value (E), it is determined that the engine mount damper is broken.

Additionally, the display portion 200 and the speaker guides the engine mounting damper to be replaced (S216).

Figure 5:
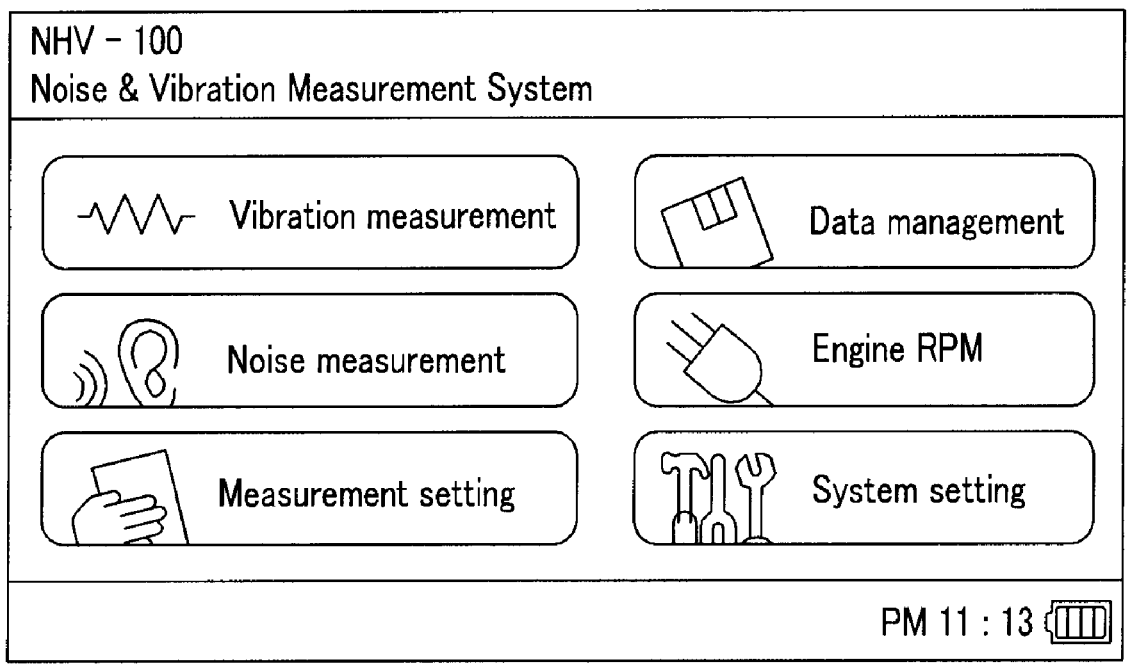
FIG. 5 shows an initial screen in an exemplary noise and vibration diagnosis device for a vehicle according to the present invention.

FIG. 5 shows an initial screen in a noise and vibration diagnosis device for a vehicle according to various embodiments of the present invention, and FIG. 6 shows a vehicle information setting screen in a noise and vibration diagnosis device for a vehicle according to various embodiments of the present invention.

When the vehicle is taken into an A/S center to diagnose a noise and vibration problem thereof, the touch panel or the function keys are 115 used to select one of noise measuring and vibration measuring in a measurement condition of a main screen of FIG. 5.

If the measurement condition setting is completed, the screen is switched to the vehicle data input screen as shown in FIG. 6, and the user uses the touch panel or the function keys 115 to set the vehicle data that includes the kind of vehicle, the kind of engine (exhaust amount), and a vehicle number.

Figure 7:
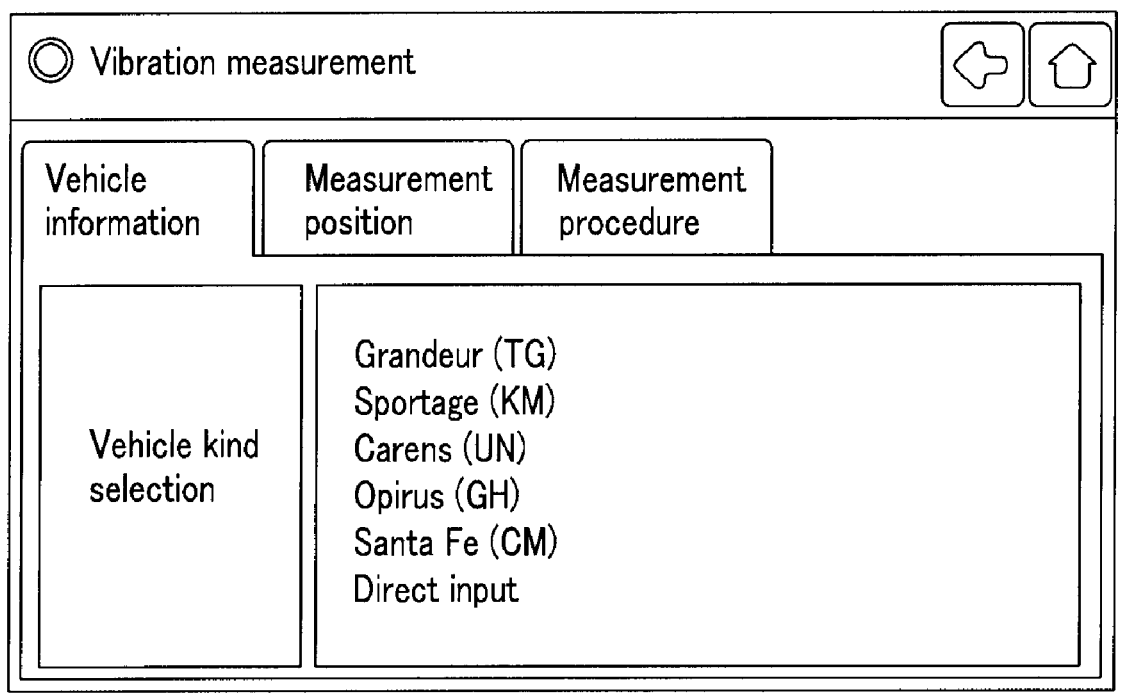
FIG. 7 shows a vehicle selection screen in the vehicle information setting step according to FIG. 6.

As shown in FIG. 7, the change button is used to select the kind of vehicle or the kind of engine that is to be measured in the screen.

The kind of vehicle and the kind of engine can be directly input by the user.

Figure 8:
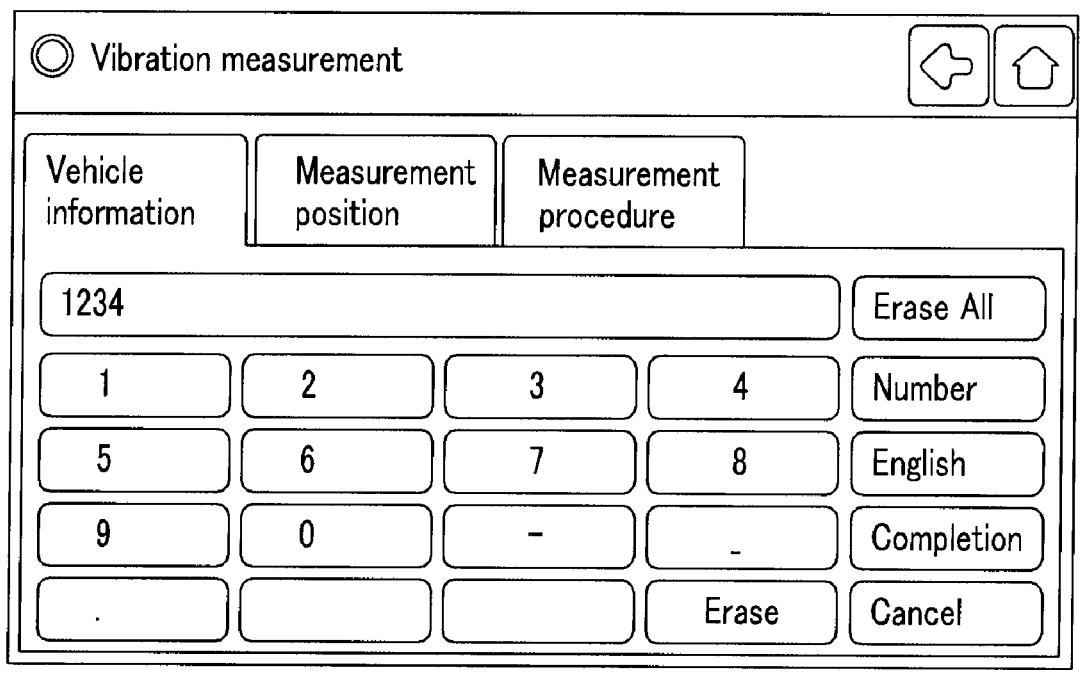
FIG. 8 shows a vehicle number input screen in the vehicle information setting step according to FIG. 6.

Further, the vehicle number, for example 1234, is established according to the selection of the input button in the input screen as shown in FIG. 8.

As shown in FIG. 6, the file name of the measurement data is automatically formed in the noise and vibration diagnosis device according to the present invention.

Figure 9:
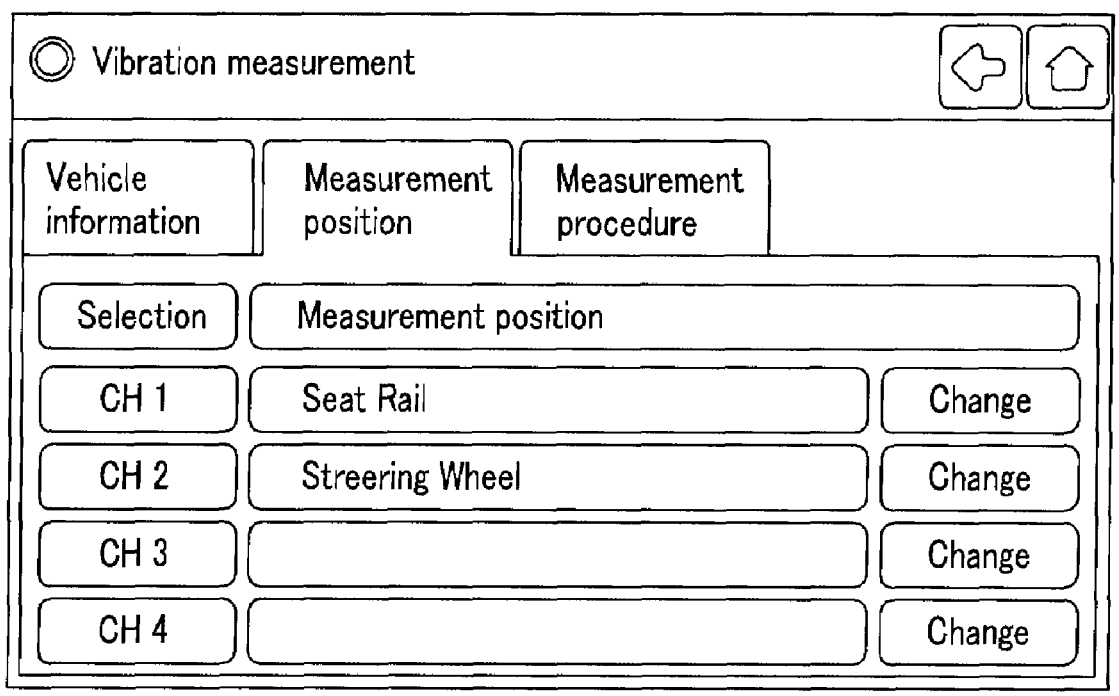
FIG. 9 shows an exemplary vibration measurement position screen in a noise and vibration diagnosis device for a vehicle according to the present invention.

If the input of the vehicle data and the measure condition are completely set, the measurement position is selected as shown in FIG. 9.

Figure 10:
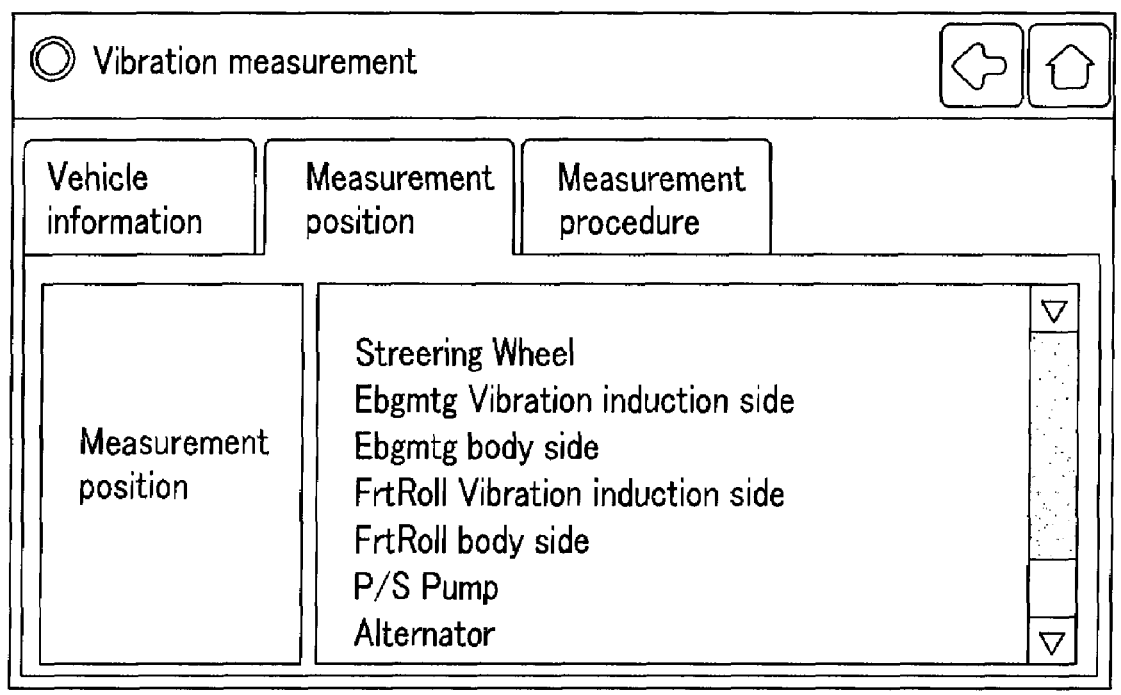
FIG. 10 shows an exemplary vibration measurement position selection screen in a noise and vibration diagnosis device for a vehicle according to the present invention.

The shift button is used to select the measurement position according to the channels to be measured, and the screen on which a variety of measurement positions is provided as shown in FIG. 10.

Figure 11:
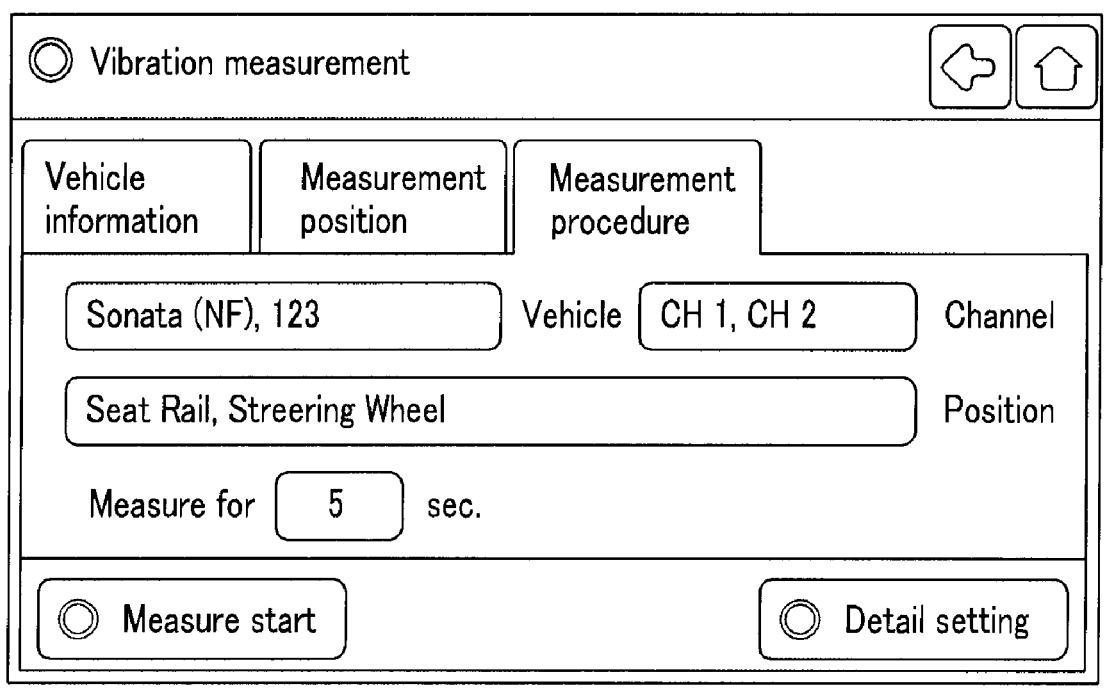
FIG. 11 shows an exemplary vibration measurement selection result in a noise and vibration diagnosis device for a vehicle according to the present invention.

If the conditions are completely set to measure the noise and vibration according to the above procedure, the selected final information is displayed as shown in FIG. 11.

Figure 12:
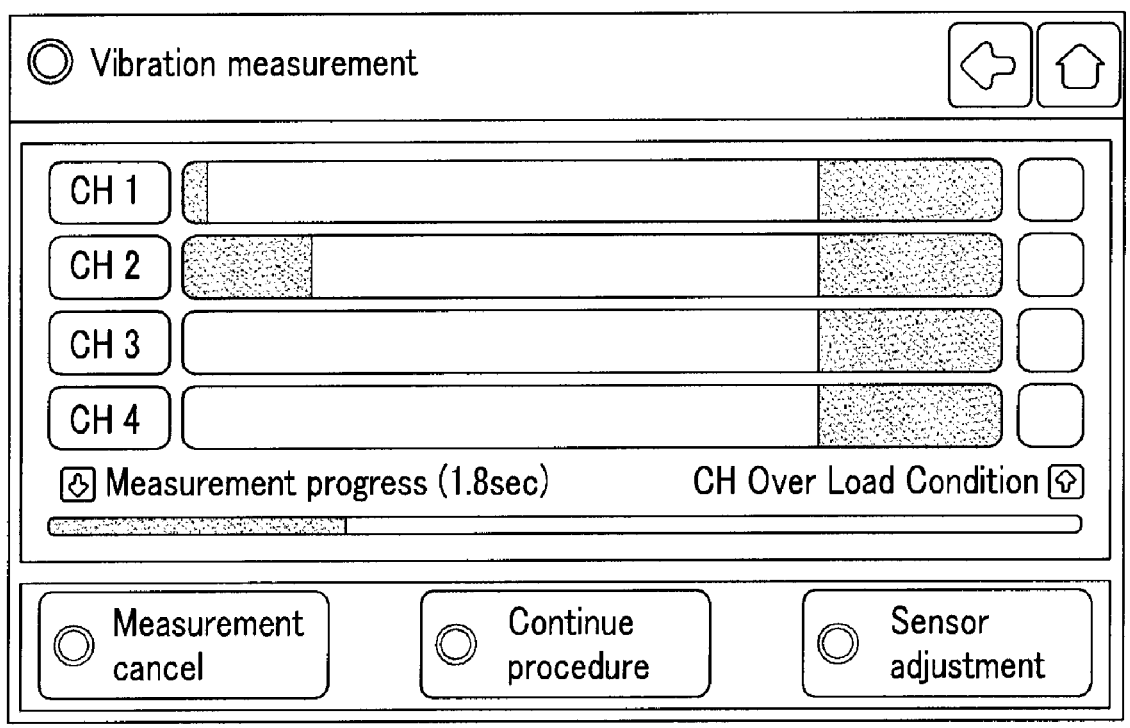
FIG. 12 shows an exemplary vibration measurement progress screen of a noise and vibration diagnosis device for a vehicle according to the present invention.

If the measurement start button is selected in FIG. 11, the noise and vibration of the predetermined position are measured for a predetermined period in a predetermined condition, and the measurement progress state is displayed as shown in FIG. 12.

Figure 13:
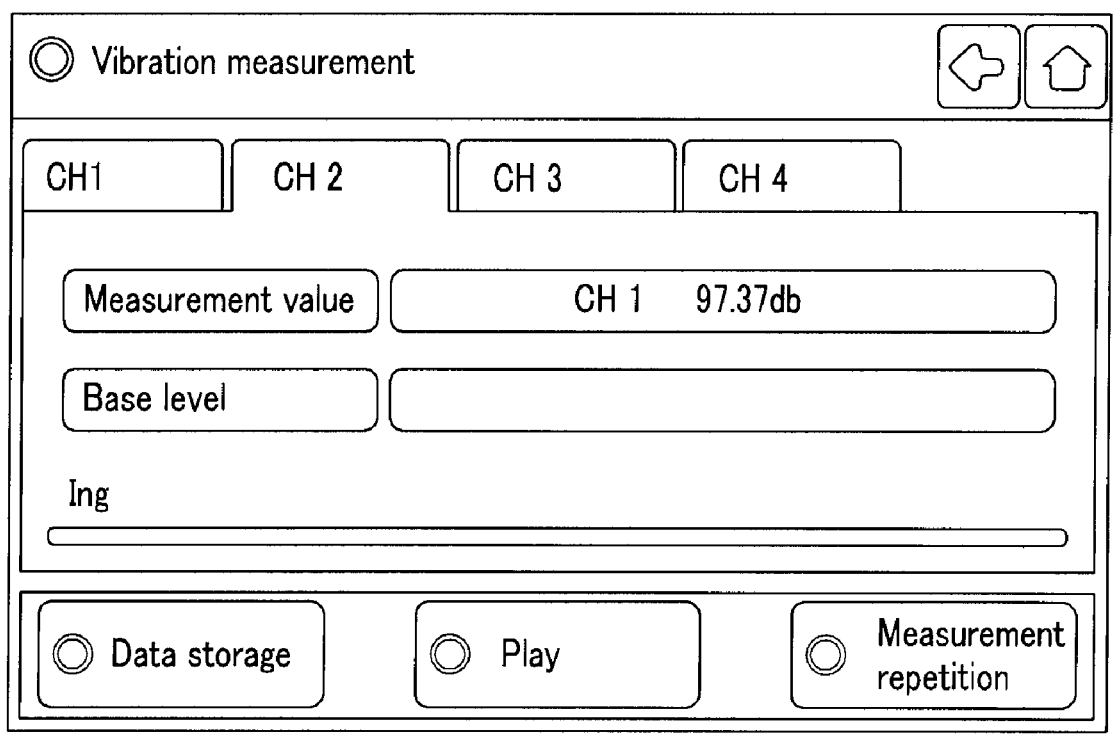
FIG. 13 shows an exemplary vibration measurement completion screen in a noise and vibration diagnosis device for a vehicle according to the present invention.

Then, if the measurement is completed, the measurement result is displayed as shown in FIG. 13.

FIG. 13 shows results that are measured through a channel 1.

Figure 14:
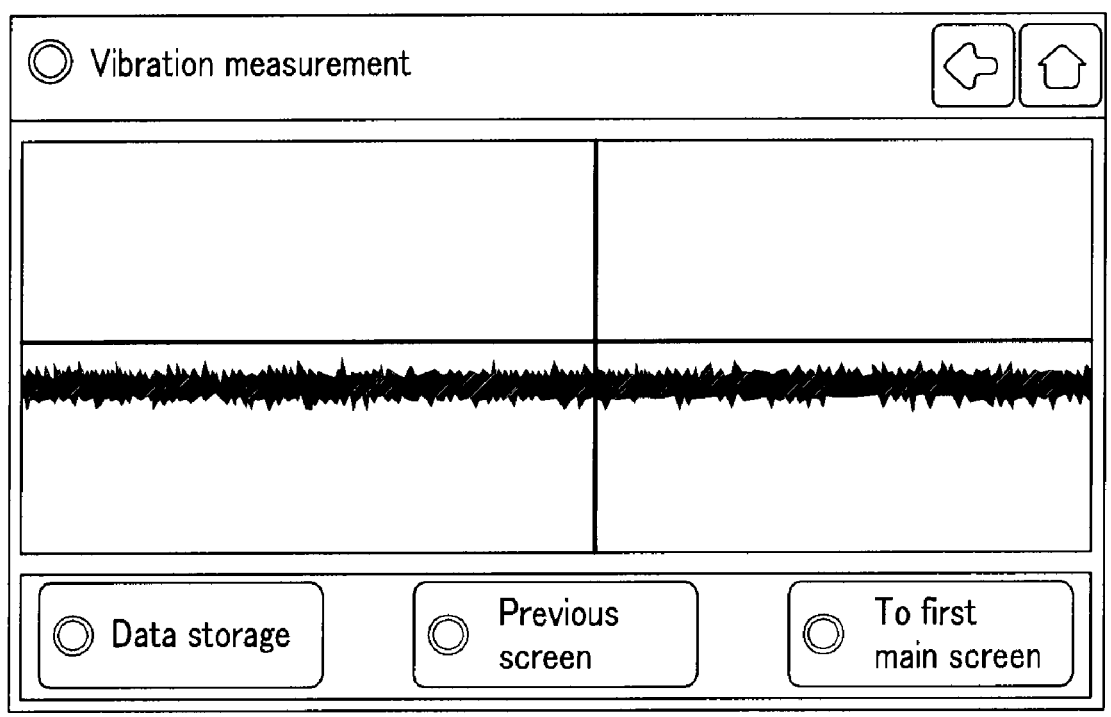
FIG. 14 shows an exemplary replay screen of the vibration that is measured in a noise and vibration diagnosis device for a vehicle according to the present invention.

The data storage button is selected to store the measurement result of FIG. 13 in the data storage portion, and then the measurement operation is repeated by selecting the repeat button. Further, if the play button is selected, the measurement result is played as shown in FIG. 14.

Figure 15:
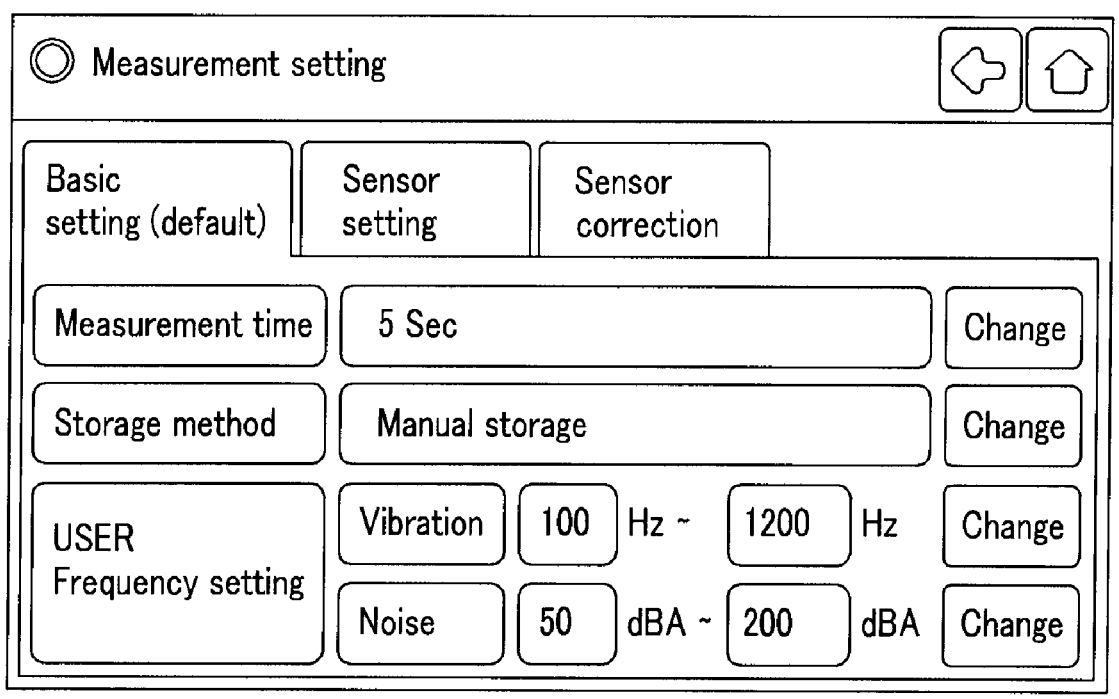
FIG. 15 shows an exemplary screen for changing a measurement setting in a noise and vibration diagnosis device for a vehicle according to the present invention.

Also, if the measurement setting is selected in the main screen of FIG. 5, a basic setting screen is displayed to set such things as measurement time, storage method, and user frequency range for measuring the noise and vibration, as shown in FIG. 15.

The measurement time can be adjusted at an interval of 5 seconds in the basic setting screen by selecting the change button, and the user frequency range can also be adjusted to a desirable range by selecting the number in the number input screen.

Figure 16:
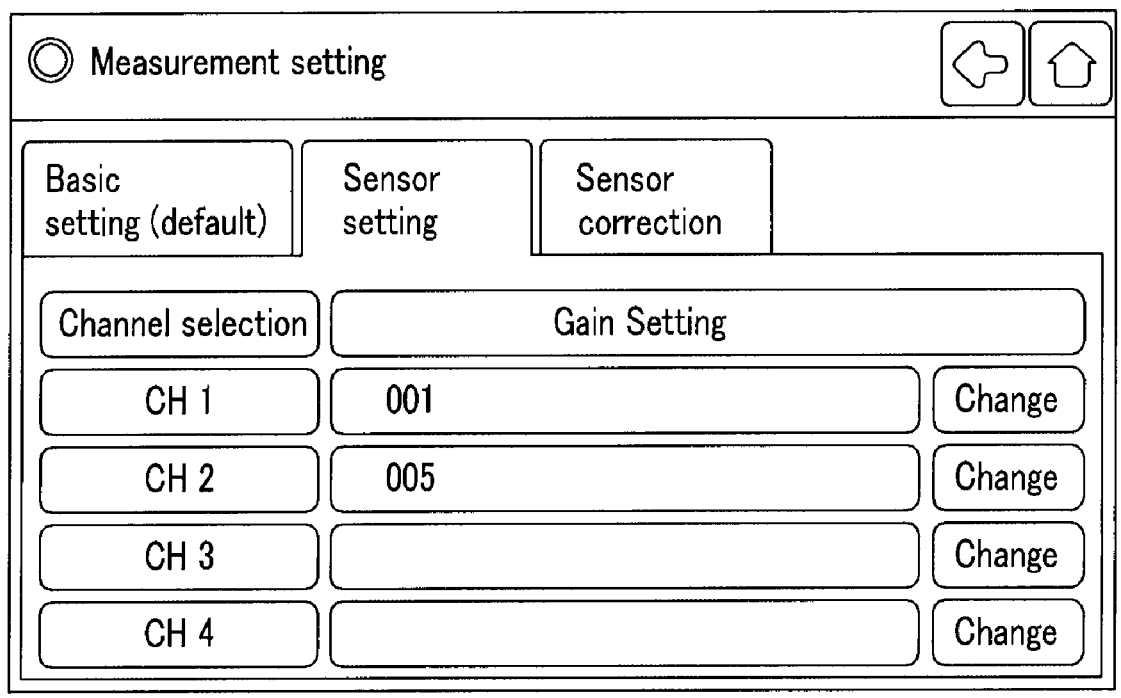
FIG. 16 shows an exemplary screen for changing a sensor setting in a noise and vibration diagnosis device for a vehicle according to the present invention.

If a sensor setting is selected in the screen of FIG. 15, the screen is converted to the screen of FIG. 16 and the GAIN (amplification rate) of the measuring sensor according to each channel is displayed, and the GAIN can be adjusted by selecting the change button.

Figure 17:
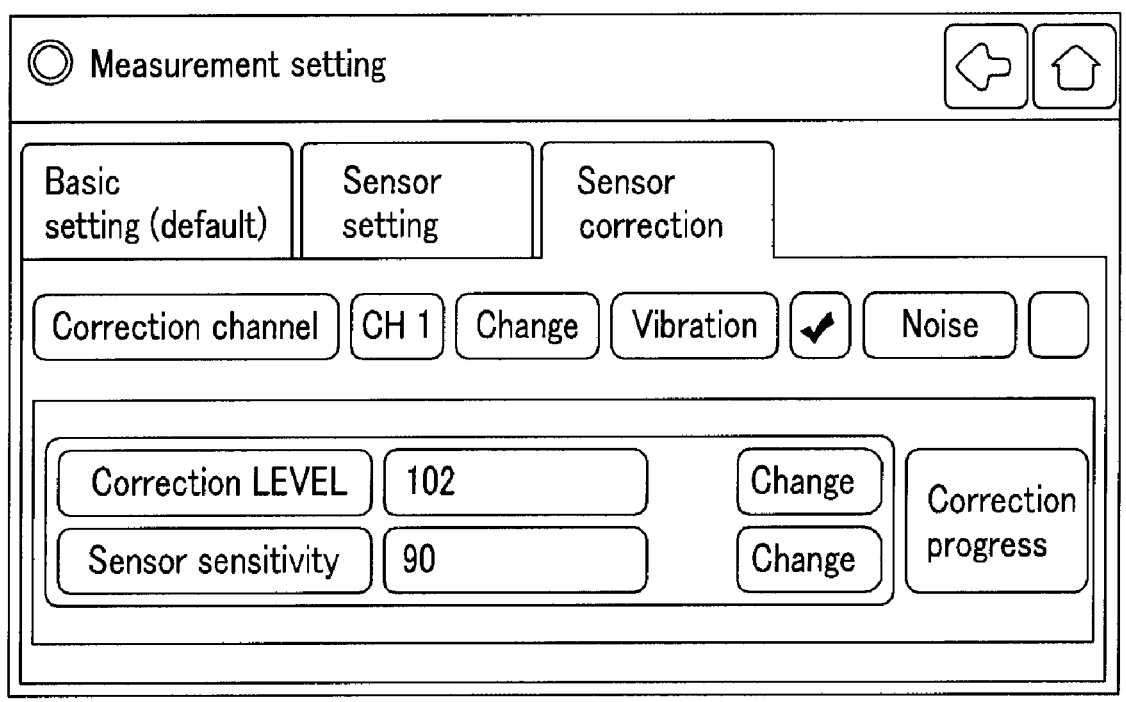
FIG. 17 shows an exemplary screen for changing a sensor correction value in a noise and vibration diagnosis device for a vehicle according the present invention.

Also, if the sensor correction is selected in the screen of FIG. 15, the screen is converted to the screen of FIG. 17 that displays a correction level and a sensor sensitivity of the selected channel, and the channel, the correction level, and the sensor sensitivity can be adjusted therein.

Figure 18:
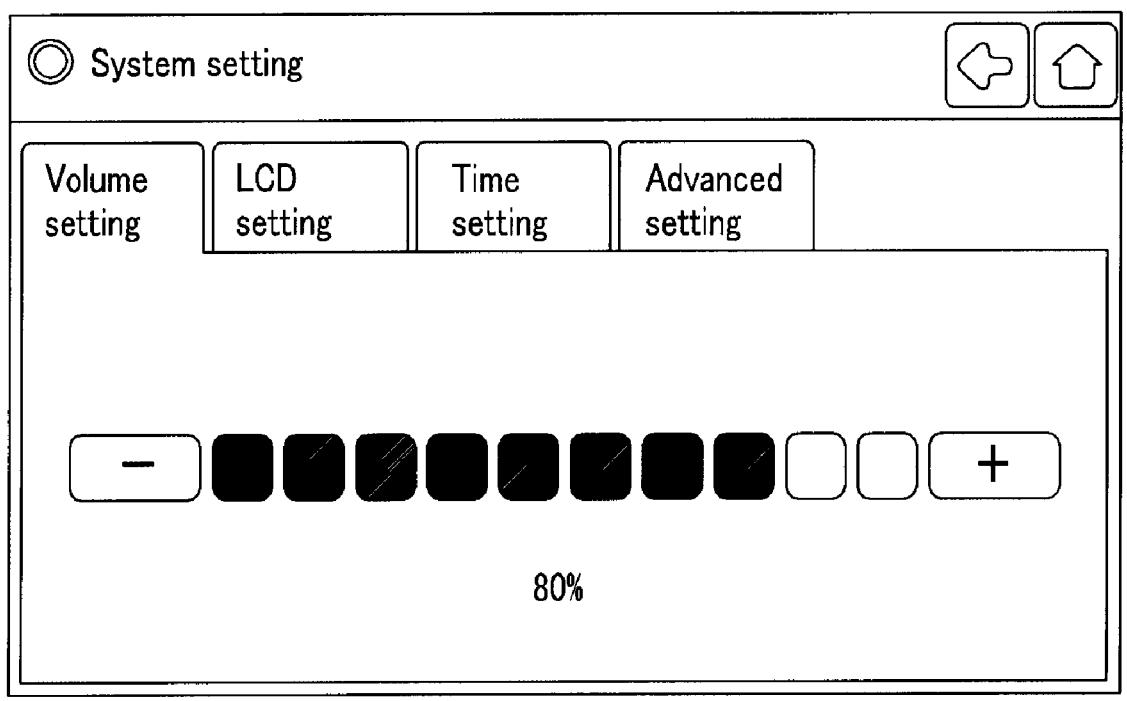
FIG. 18 shows an exemplary volume setting screen in a noise and vibration diagnosis device for a vehicle according to the present invention.

If the system setting is selected in the main screen of FIG. 5, the screen is converted to a predetermined screen of FIG. 18, if a volume control is selected in the predetermined screen, the present volume level is displayed, and the volume can be adjusted to a desired level by selecting a volume button (−, +).

The brightness of the screen can be also adjusted through a, LCD screen setting as with the volume control.

Figure 19:
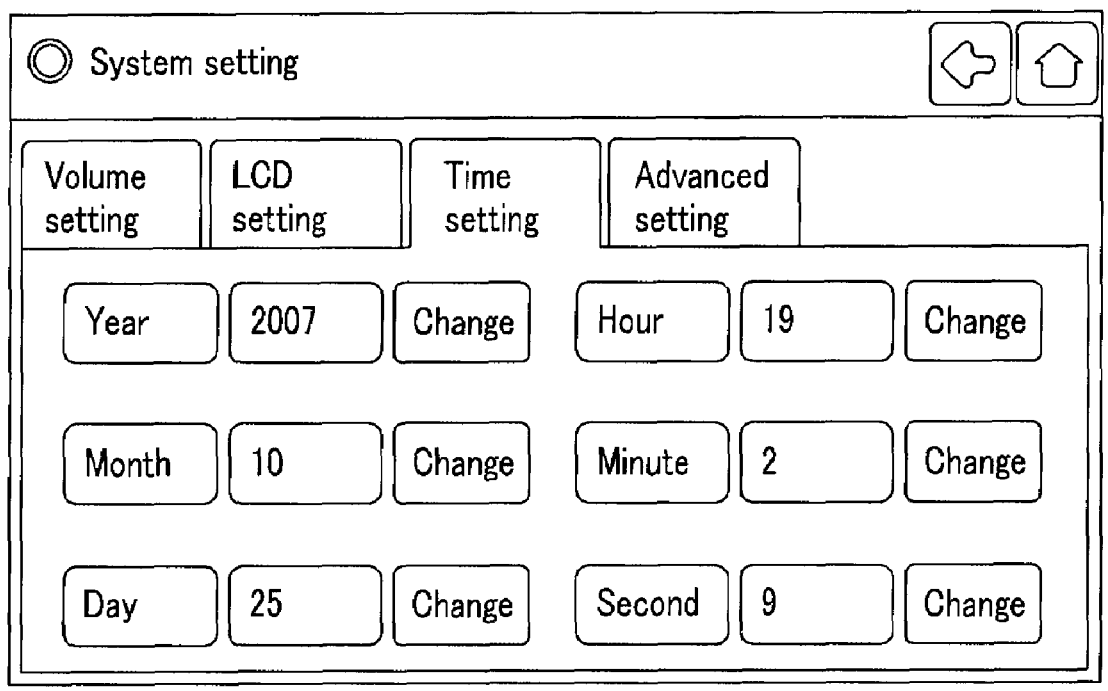
FIG. 19 shows an exemplary time setting screen in a noise and vibration diagnosis device for a vehicle according to the present invention.

If a time establishment is selected in the screen of FIG. 18, the screen is converted to the screen of FIG. 19 and a list that is displayed is used to respectively establish a year, a month, a day, an hour, a minute, and a second.

Figure 20:
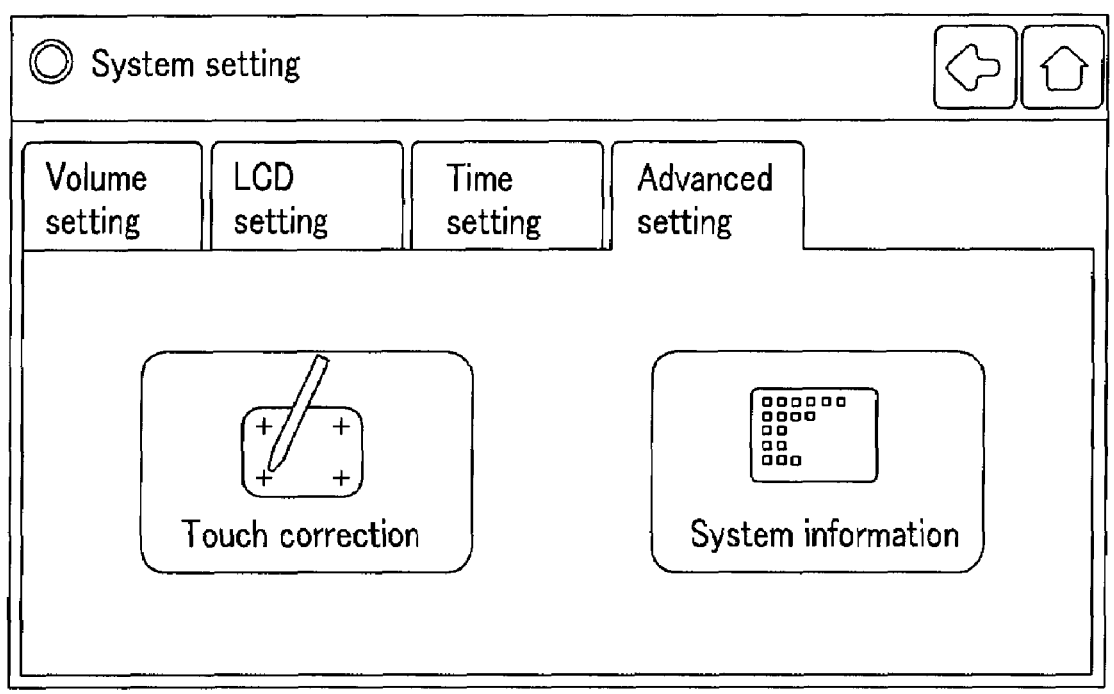
FIG. 20 shows an exemplary advanced setting screen of a noise and vibration diagnosis device for a vehicle according to the present invention.

Also, if advanced establishment is selected in the screen of FIG. 18, the screen is converted to the screen of FIG. 20 and the sensitivity correction of the touch panel can be achieved, and the system information can be accessed therein.

The system version can be confirmed through the access to the system information, and the firmware can be upgraded according to the confirmed version.

For convenience in explanation and accurate definition in the appended claims, the terms "upper", "lower", "front", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method of a noise and vibration diagnosis device for a vehicle, comprising:
   setting a noise and vibration measurement condition through a user interface and measuring noise and vibration of a seat rail and a handle;
   determining whether the measured noise and vibration value is higher than a reference value (A) that is predetermined at a predetermined position according to a vehicle;
   determining that the vehicle is in abnormal state if the noise and vibration measurement value is in excess of the reference value (A) and determining whether the noise and vibration measurement value of the vibration induction side of an engine mount is in excess of a reference value (B);
   determining whether the noise and vibration measurement value of a rotational component configured to be connected to the engine is in excess of a reference value (C) if the measurement value of the vibration induction side of the engine mount is in excess of the reference value (B); and
   determining a defective component that is related to the noise and vibration and performing a guidance function to replace a predetermined component if the noise and vibration measurement value of the rotational component is in excess of the reference value (C).

2. The control method of claim 1, wherein if the noise and vibration measurement value of the rotational component does not exceed the reference value (C), it is determined that the tensile force of a belt is in an abnormal range to indicate that the belt to be replaced.

3. The control method of claim 1, wherein the rotational component includes an alternator, a power steering pump, and an air conditioner compressor.

4. The control method of claim 1, wherein if the measurement value of the vibration induction side of the engine mount does not exceed the reference value (B), the noise and vibration of the vehicle body side in the engine mount is measured, if a difference value (a) of the measurement value of the vibration induction side of the engine mount minus the measurement value of the engine mount vehicle body side exceeds a reference value (E), it is determined whether the rotational component is in a normal state or not, and if the difference value (a) does not exceed the reference value (E), it is determined that the engine mount is in an abnormal state to indicate replacement thereof.

* * * * *